BEST AVAILABLE COPY

DEFENSIVE PUBLICATION

T856,032

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 19, 1968

856 O.G. 670

688,320 —

PROCESS FOR PREPARING ACRYLIC ACID AND CATALYSTS THEREFOR

Edgar L. McDaniel and Howard S. Young, both % Tennessee Eastman Company, P.O. Box 511, Kingsport, Tenn. 37662

Filed Dec. 6, 1967. Published Nov. 19, 1968

Class 260—533

No Drawing. 25 Pages Specification

Process for the oxidative conversion of propylene to acrylic acid comprising contacting a mixture of vaporized propylene and oxygen at a temperature from about 350° C. to about 550° C. with a novel catalyst comprising oxidized arsenic, oxidized molybdenum and at least one of oxidized zirconium and oxidized titanium. The catalysts may be supported, preferably on silica. Among the compounds from which the molybdenum component may be derived are heteropoly acids of molybdenum, or their ammonium salts, containing cerium, silicon, or chromium as the central atom. Acrylic acid may be subsequently converted to lower alkyl esters for use in the plastics industry.